W. L. HURST.
CONTROLLING DEVICE FOR WATERWAYS.
APPLICATION FILED OCT. 18, 1913.
1,093,425.
Patented Apr. 14, 1914.
2 SHEETS—SHEET 1.
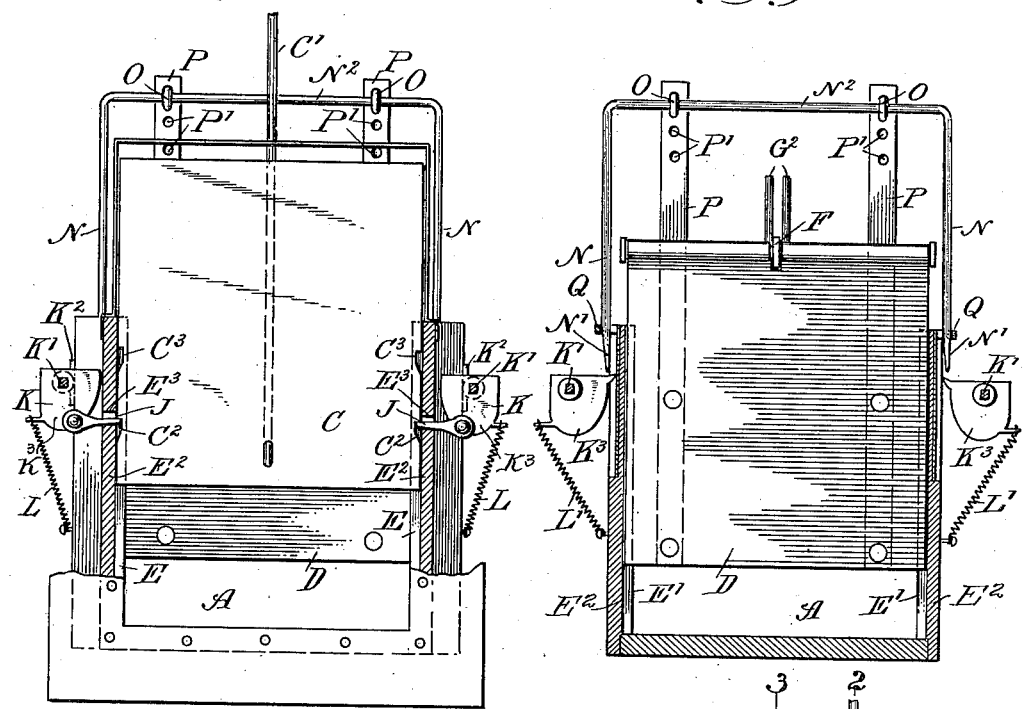
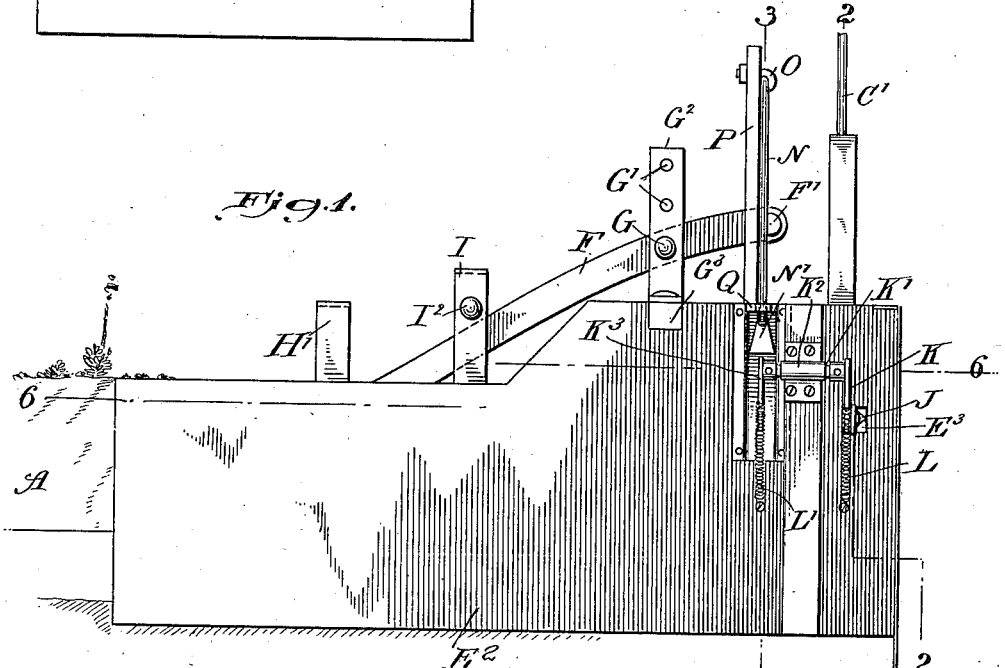
WITNESSES
INVENTOR
Wilford Lafayette Hurst
BY
ATTORNEYS

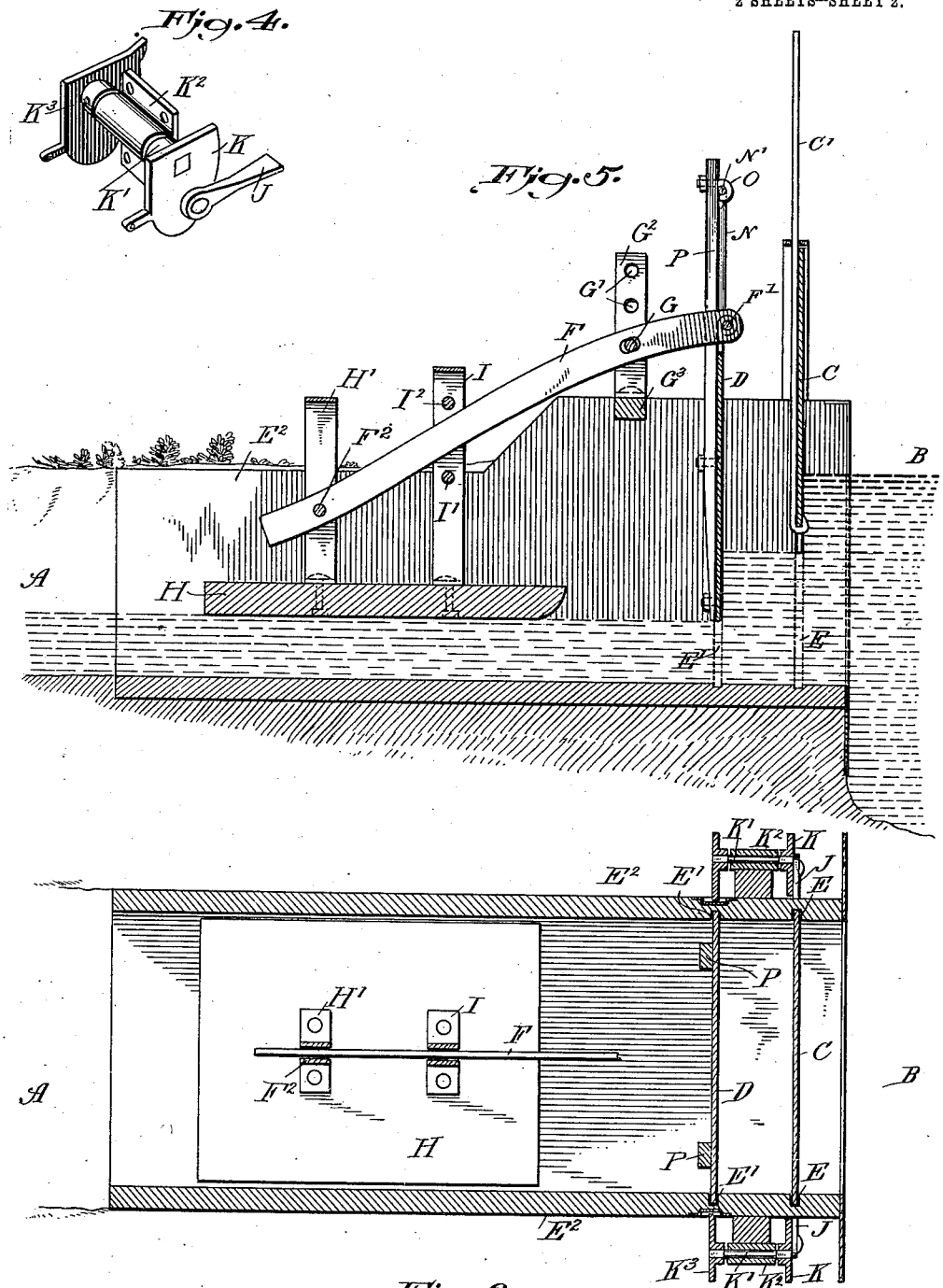

UNITED STATES PATENT OFFICE.

WILFORD LAFAYETTE HURST, OF ASPEN, COLORADO.

CONTROLLING DEVICE FOR WATERWAYS.

1,093,425. Specification of Letters Patent. Patented Apr. 14, 1914.

Application filed October 18, 1913. Serial No. 795,895.

*To all whom it may concern:*

Be it known that I, WILFORD LAFAYETTE HURST, a citizen of the United States, and a resident of Aspen, in the county of Pitkin and State of Colorado, have invented a new and Improved Controlling Device for Waterways, of which the following is a full, clear, and exact description.

The object of the invention is to provide a new and improved controlling device for use in irrigation ditches and other waterways, and arranged to automatically regulate the volume of water flowing through the ditch under normal conditions, to keep the controlling device automatically free of accumulating trash and other extraneous matter, and to automatically close the water-way in case of a flood.

In order to produce the desired result, use is made of a normally open shut-off or flood gate arranged in the water-way, a float-controlled regulating gate arranged in the water-way and controlled by the rise and fall of the water in the water-way, and supporting means normally supporting the shut-off gate in raised position and controlled by the said regulating gate, the latter under normal conditions controlling the volume of water passing through the water-way, and the said regulating gate under abnormal or flood conditions releasing said supporting means to allow the said shut-off or flood gate to drop into closed position thereby shutting off the water from the water-way.

A practical embodiment of the invention is represented in the accompanying drawings forming a part of this specification, in which similar characters of reference indicate corresponding parts in all the views.

Figure 1 is a side elevation of the controlling device for water-ways as applied; Fig. 2 is a transverse section of the same on the line 2—2 of Fig. 1; Fig. 3 is a similar view of the same on the line 3—3 of Fig. 1; Fig. 4 is a perspective view of one of the releasing devices; Fig. 5 is a longitudinal section of the controlling device as applied; and Fig. 6 is a sectional plan view of the same on the line 6—6 of Fig. 1.

The entrance of the ditch or other water-way A to the head B is controlled by a shut-off or flood gate C and a regulating gate D, the said gates C and D being mounted to slide up and down in suitable guideways E, E' arranged in the abutments $E^2$ built in the water-way A. The regulating gate D is pivotally connected at its upper edge at F' with a float lever F fulcrumed on a rod G extending transversely and adjustably held in one of a series of openings G' arranged in a post $G^2$ attached to a cross bar $G^3$ spanning the abutments $E^2$. The lever F extends down stream and is pivotally connected at $F^2$ with a bracket H' arranged on a float H extending in the water-way A below the regulating gate D. The float H rises and falls with the water in the water-way A and in doing so it imparts a swinging motion to the float lever F whereby the regulating gate D is raised or lowered to automatically regulate the volume of water passing down the water-way A. By adjusting the rod G in the post $G^2$ the gate D can be set to open more or less under normal conditions according to the volume of water desired to flow from the head B through the water-way A. The float lever F is guided in a bracket I attached to the float H intermediate the bracket H' and the rod G, and the said bracket I is provided with pins I', $I^2$, spaced from the top and bottom edges of the said lever to allow a slight oscillation of the float H relative to the float lever and to maintain the float in an approximately horizontal position on the float rising and falling. It will be noticed that in case trash locates against the face of the gate D in the water-way A then the float H falls a sufficient distance to raise the gate D and thus allow the trash or other extraneous matter to pass under the gate D and down the water-way A. As soon as the gate D is relieved of the extraneous matter the inrush of the water causes the float H to rise whereby the gate D is lowered to normal position. It is further understood that according to the amount of water drawn from the water-way A for irrigating or other purposes its level falls and rises to cause the gate D to correspondingly rise and fall to supply the water-way A with the proper volume of water.

The shut-off or flood gate C is normally held in a raised position with its lower edge above the lower edge of the regulating gate D when the latter is in normal position. The gate C is provided with an upwardly-extending rod C' adapted to be raised, the latter being provided at its sides with sets of notches $C^2$, $C^3$ located one above the other, as plainly indicated in Fig. 2. One of the set of notches $C^2$ or $C^3$ is engaged at a time by a supporting means J preferably in the form of bolts mounted to slide transversely in suitable guideways E³ arranged in the abutments E² (see Fig. 2). Thus by the arrangement described the shut-off or flood gate C is normally held in raised position.

The supporting means J are pivotally connected with arms K held on rock shafts K′ journaled in suitable bearings K² attached to the outside of the abutments E². On the rock shafts K′ are secured arms K³ adapted to be engaged by the lower ends N′ of rods N extending upwardly and having their upper ends attached to or forming part of a cross bar N² fastened by clips O to bars P secured to the regulating gate D and extending upwardly therefrom. Each of the clips O is adjustably held in one of a series of apertures P′ arranged in the corresponding bar P to allow of raising or lowering the bar N² and the rods N with a view to move the lower ends N′ nearer to or farther from the arms K³. The lower portions of the rods N are mounted to slide in guideways Q attached to the outside of the abutments E². Springs L, L′ press on the arms K, K³ to normally hold the supporting means J in engagement with the corresponding set of notches C² or C³, and to hold the arms K³ in position for engagement by the ends N′ of the rods N. The lower ends N′ are a distance above the arms K³ so as not to engage the said arms K³ during the ordinary rising movement of the gate D. In case of a flood and consequent rise of the water in the water-way A beyond normal high level the float H rises correspondingly and in doing so moves the gate D downward whereby the ends N′ of the rods N engage the arms K³ and impart a swinging motion to the same against the tension of the springs L, L′ whereby a rocking movement is given to the rock shafts K′ so that the arms K swing outwardly and withdraw the supporting means J from the notches C² or C³ of the gate C to allow the latter to drop into closed position. When this takes place the water from the head B to the waterway A is completely shut off thus preventing injury to the banks of the water-way A by a heavy flood.

It is understood that during a heavy rain the water in the water-way A rises sufficiently high to cause the float H to move the regulating gate D a sufficient distance downward for the ends N′ of the arms N to actuate the releasing device for the shut-off or flood gate C to allow the latter to drop as previously explained. It will be noticed that when this takes place the head B is disconnected from the water-way A, and the water accumulating in the water-way A from the heavy rain can be taken care of without danger of breaking the banks of the water-way. After the flood has subsided in the water-way A the gate D returns to normal position owing to the action of the float H, and then the gate C is raised by the operator to allow the supporting means J to re-engage the desired set of notches C² or C³ to hold the gate C locked in open position.

The float H is beveled or rounded off at its forward end (see Fig. 5) to offer the least resistance to the current of water, thus insuring easy riding of the float on the water and preventing the float from being sucked under by the flowing water. The bracket H′ is located somewhat in the rear of the float so that the full lifting power of the float is transmitted to the float lever F.

Having thus described my invention, I claim as new and desire to secure by Letters Patent:

1. A water-controlling device for water-ways, comprising a shut-off gate arranged in the water-way and normally in open position, a regulating gate arranged in the said water-way, means actuated by the rise and fall of the water in the said water-way for lowering and raising the said regulating gate to regulate the amount of the water flowing through the water-way under normal conditions, and means for automatically controlling the closing of the said shut-off gate on an abnormal rise of the water in the water-way.

2. A water-controlling device for waterways, comprising a gate arranged in the water-way and normally open, a regulating gate in the water-way next below the said shut-off gate, means actuated by the rise and fall of the water in the water-way for lowering or raising the said regulating gate, and supporting means controlled by the said regulating gate for normally holding the said shut-off gate in raised open position and for releasing the said shut-off gate on an abnormal rise of the water in the water-way to allow the said shut-off gate to drop into closed position.

3. A water-controlling device for waterways, comprising a shut-off gate arranged in the water-way, supporting means engaging the said shut-off gate to hold the same normally in raised open position, the said supporting means being adapted to release the said shut-off gate to allow the latter to drop into closed position, a regulating gate arranged in the water-way next below the said shut-off gate, a float in the said water-way below the said regulating gate, connecting means connecting the said float with the said regulating gate, and releasing means controlled by the said regulating gate and connected with the said supporting means for the shut-off gate.

4. A water-controlling device for waterways, comprising a shut-off gate arranged in the water-way, supporting means engaging the said shut-off gate to hold the same normally in raised position, the said supporting means being adapted to release the said shut-off gate to allow the latter to drop into closed position, a regulating gate arranged in the water-way next below the said shut-off gate, a float in the said water-way below the said regulating gate, a float lever connecting the said float with the said regulating gate, and a releasing device having bars held on the said regulating gate and spring-pressed arms mounted to swing and adapted to be engaged by the said bars, the said arms being connected with the said supporting means.

5. A water-controlling device for water-ways, comprising a regulating gate arranged in the water-way, a float in the said water-way, a lever pivotally connecting the said float with the said gate, and a guide for the said lever and held on the said float intermediate the gate and the pivotal connection of the lever with the float.

In testimony whereof I have signed my name to this specification in the presence of two subscribing witnesses.

WILFORD LAFAYETTE HURST.

Witnesses:
C. F. BROWN,
HARRY A. BROWN.

Copies of this patent may be obtained for five cents each, by addressing the "Commissioner of Patents, Washington, D. C."